(12) United States Patent
Zhang et al.

(10) Patent No.: US 12,323,732 B2
(45) Date of Patent: Jun. 3, 2025

(54) METHODS AND SYSTEMS FOR JUDDER ADJUSTMENT IN MAJOR MOTION PICTURES

(71) Applicant: Pixelworks, Inc., San Jose, CA (US)

(72) Inventors: Hongmin Zhang, Santa Clara, CA (US); Minghui Yang, Shanghai (CN); Yue Ma, Los Altos, CA (US); Neil Woodall, Newport Beach, CA (US)

(73) Assignee: PIXELWORKS, INC., San Jose, CA (US)

( * ) Notice: Subject to any disclaimer, the term of this patent is extended or adjusted under 35 U.S.C. 154(b) by 22 days.

(21) Appl. No.: 18/347,332

(22) Filed: Jul. 5, 2023

(65) Prior Publication Data

US 2025/0016284 A1    Jan. 9, 2025

(51) Int. Cl.
| | |
|---|---|
| *H04N 7/01* | (2006.01) |
| *G06F 3/0482* | (2013.01) |
| *G06T 5/20* | (2006.01) |
| *G06T 5/70* | (2024.01) |
| *G06T 5/73* | (2024.01) |
| *G06T 7/70* | (2017.01) |
| *G06T 7/73* | (2017.01) |
| *H04N 5/95* | (2006.01) |

(52) U.S. Cl.
CPC ............. *H04N 7/0147* (2013.01); *G06T 5/20* (2013.01); *G06T 5/70* (2024.01); *G06T 5/73* (2024.01); *H04N 5/95* (2013.01); *H04N 7/013* (2013.01); *G06F 3/0482* (2013.01)

(58) Field of Classification Search
CPC .... G01R 31/31709; H04N 5/95; H04N 7/014; H04N 7/013; G06F 3/0482; G06T 5/20; G06T 5/70; G06T 5/73; G06T 7/529; G06T 2207/20201
See application file for complete search history.

(56) References Cited

U.S. PATENT DOCUMENTS

| | | | | |
|---|---|---|---|---|
| 7,508,449 | B1 * | 3/2009 | Greenberg | H04N 7/012 348/449 |
| 9,491,398 | B1 * | 11/2016 | Hou | H04N 7/013 |
| 10,284,870 | B1 * | 5/2019 | Yang | H04N 19/513 |
| 10,368,031 | B2 * | 7/2019 | Xu | H04N 5/21 |
| 10,499,009 | B1 * | 12/2019 | Zhang | H04N 7/0127 |
| 10,944,938 | B2 * | 3/2021 | Xu | H04N 19/157 |
| 10,997,697 | B1 * | 5/2021 | Newman | H04N 23/51 |
| 11,019,302 | B2 * | 5/2021 | Pytlarz | H04N 19/117 |
| 11,356,604 | B2 * | 6/2022 | Woodall | H04N 7/0127 |

(Continued)

*Primary Examiner* — Brian P Yenke
(74) *Attorney, Agent, or Firm* — McCoy Russell LLP

(57) ABSTRACT

Methods and systems are herein provided for judder adjustment. In one example, a system comprises a display device configured to display scenes of a major motion picture and a user interface; and a computing device including a processor communicatively coupled to the display device, wherein the computing device is configured to execute instructions stored in non-transitory memory that, when executed cause the processor to obtain and display a scene within the user interface, interpolate frames for one or more of a plurality of input frames of the scene based on a selected judder angle, wherein the selected judder angle is selected via an adjustable dial of the user interface; and display the scene with a perceived judder resulting from the interpolated frames.

20 Claims, 7 Drawing Sheets

(56) References Cited

U.S. PATENT DOCUMENTS

| | | | |
|---|---|---|---|
| 2008/0063287 A1* | 3/2008 | Klamer | G11B 27/329 |
| | | | 382/232 |
| 2011/0122312 A1* | 5/2011 | Aiba | H04N 7/0132 |
| | | | 348/E7.003 |
| 2014/0268061 A1* | 9/2014 | Weisgerber | G03B 27/00 |
| | | | 352/40 |
| 2017/0054938 A1* | 2/2017 | Xu | H04N 7/014 |
| 2020/0382802 A1* | 12/2020 | Atkins | H04N 19/30 |
| 2021/0258510 A1* | 8/2021 | Woodall | H04N 23/6845 |
| 2023/0088882 A1* | 3/2023 | Kanberoglu | H04N 19/14 |
| | | | 382/199 |
| 2024/0107092 A1* | 3/2024 | Zhang | H04N 21/2387 |
| 2024/0267534 A1* | 8/2024 | Schroers | H04N 19/137 |

\* cited by examiner

METHODS AND SYSTEMS FOR JUDDER ADJUSTMENT IN MAJOR MOTION PICTURES

FIELD

Embodiments of the subject matter disclosed herein relate to image processing and judder adjustment, and in particular to interpolating frames based on a selected judder angle to adjust perceived judder.

BACKGROUND

Major motion pictures are shot at 24 frames per second (fps) and may be converted to higher framerates such as 48 fps, 72 fps, 120 fps, and/or 144 fps when shown to audiences. Higher framerates are achieved by frame interpolation, in which new frames are generated between input frames. Judder, a stop/start feeling that a viewer appreciates when viewing a scene caused by tracking a moving object on a screen with the eye, results when showing the content at the original 24 fps framerate. Showing the content at the higher framerates dramatically reduces the amount of perceived judder. An amount of perceived judder is also affected by brightness, panning speed, amount of motion, and more. Too much judder in a scene is distracting for the viewer, but too little judder results in degradation of the cinematic feel, dubbed the Soap Opera Effect.

BRIEF DESCRIPTION

In one embodiment, a system comprises a display device configured to display digitized video media within a user interface, wherein the user interface comprises an input element for a judder angle spectrum; and a computing device including a processor communicatively coupled to the display device, wherein the computing device is configured to execute instructions stored in non-transitory memory that, when executed, cause the processor to: display a scene within the user interface, wherein the scene comprises a plurality of input frames at an input framerate; interpolate frames for each of the plurality of input frames based on a selected judder angle, wherein the selected judder angle is selected via the input element; and display the scene with a perceived judder resulting from the interpolation of frames.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 4:
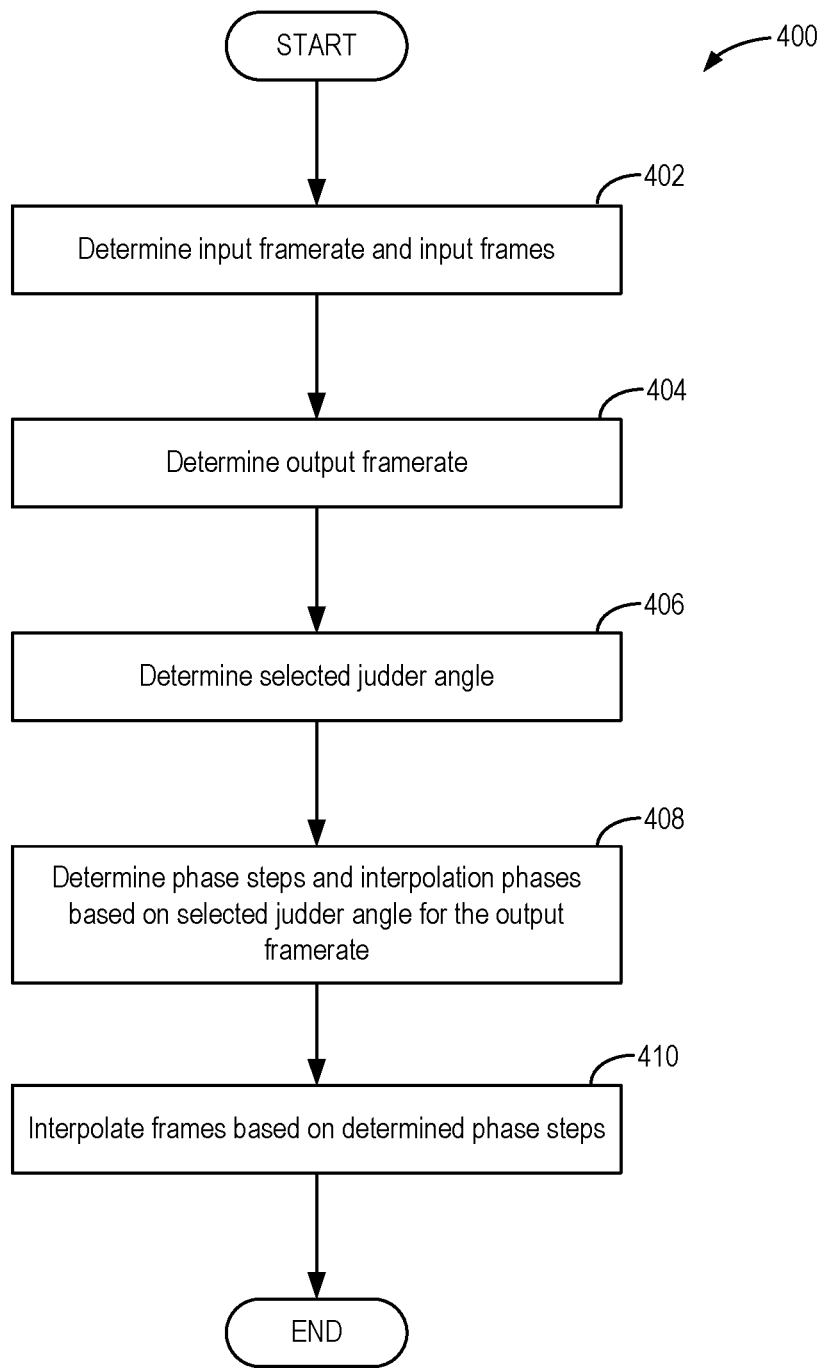
FIG. 4 shows a flowchart illustrating a method for determining frame interpolations and phase steps based on a selected judder angle.
Figure 5:
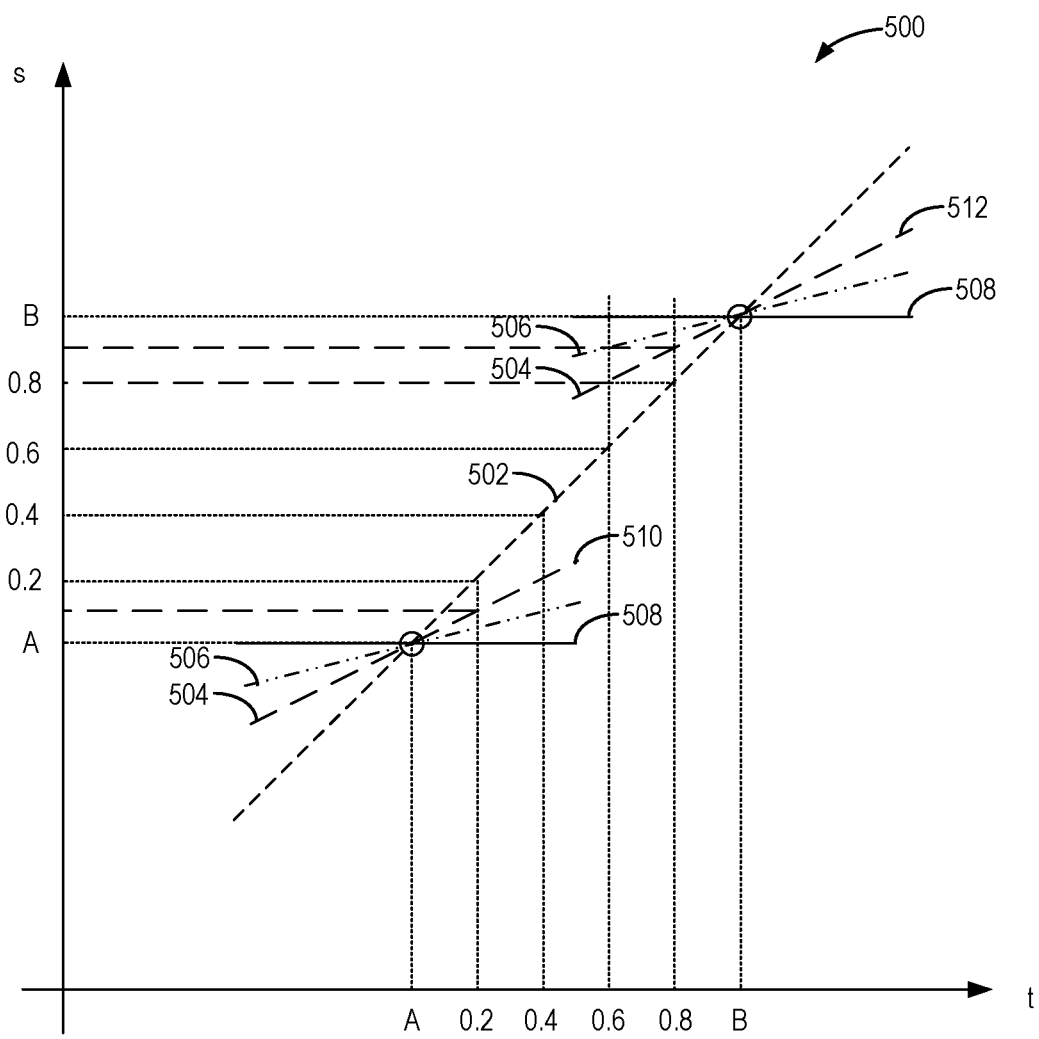
FIG. 5 shows a graph of frame interpolations and phases based on selected judder angles.
Figure 6:
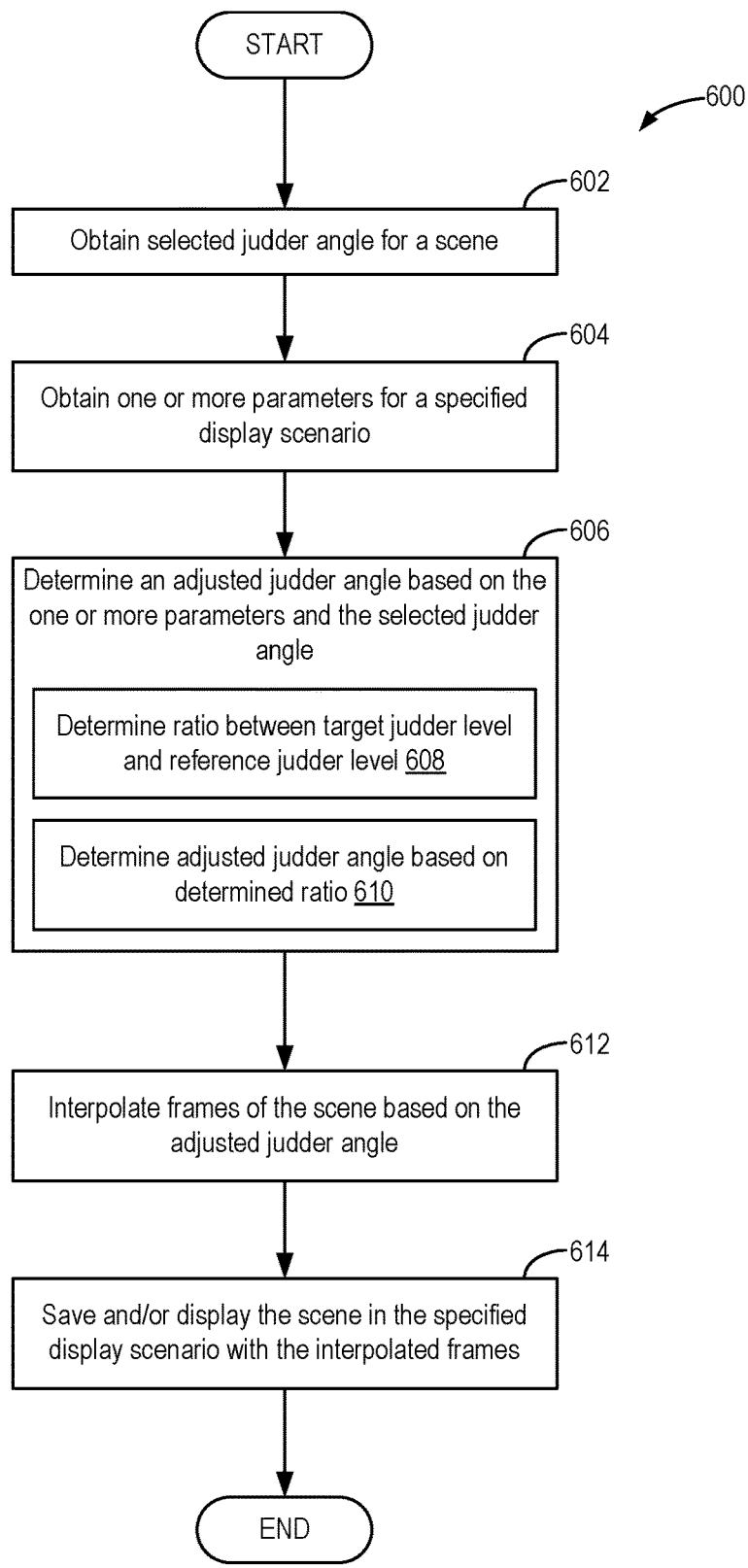
FIG. 6 shows a flowchart illustrating a method for adjusting a selected judder angle based on one or more parameters of a target display scenario.
Figure 7:
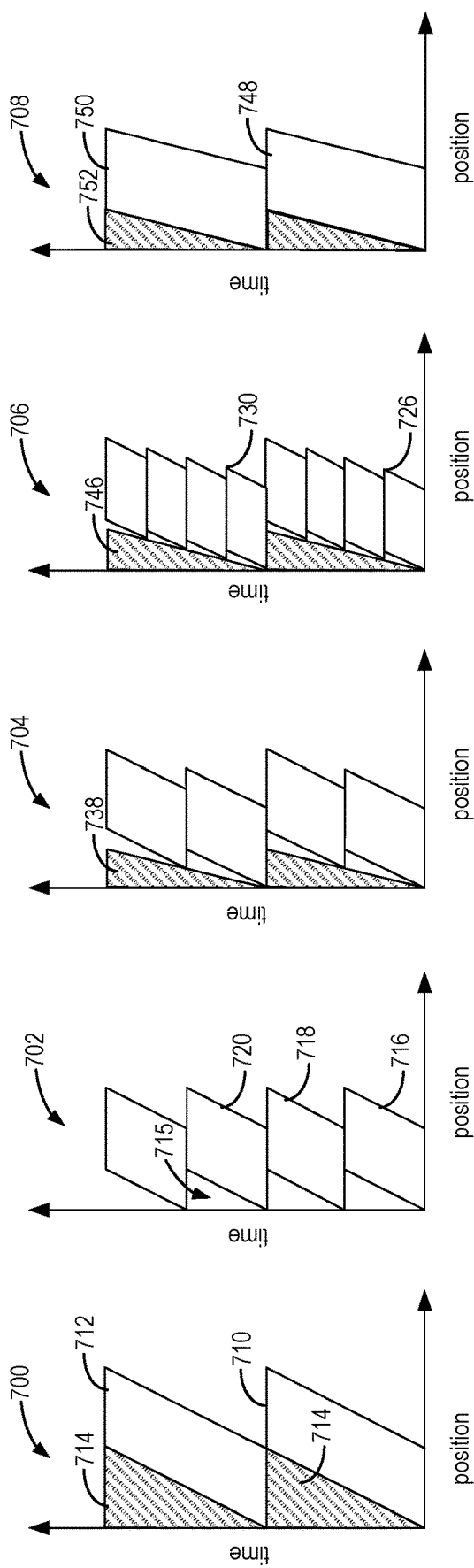
FIG. 7 shows graphs illustrating judder level at various judder angles and framerates.

The following description relates to various embodiments of image processing and display. In particular, systems and methods are provided for image processing for adjusting judder appearance in a motion picture or other digitized video media. A computing system equipped with an image processing module is depicted in a block diagram in FIG. 1. An exemplary display device and user interface is illustrated in FIG. 2. A method for adjusting perceived judder of a scene is shown in a flowchart in FIG. 3 and a method for determining frame interpolations based on a selected judder angle is shown in FIG. 4. A graph demonstrating frame interpolations and phase steps based on selected judder angles is shown in FIG. 5. A method for adjusting a selected judder angle based on one or more parameters of a target display scenario is shown in FIG. 6. A plurality of graphs illustrating judder level at various judder angles and framerates is shown in FIG. 7.

In practice, a major motion picture may be modified for optimal appearance on a variety of displays in order to fit a director's desired look (e.g., the director's intent). In some examples, major motion pictures are shot at 24 frames per second (fps) but the framerate is frequently adjusted for display in a variety of cinematic display scenarios, including different theater displays and experiences as well as at home televisions. Alterations in framerate, as well as variances in brightness, panning speed (e.g., display rate), object motion velocity, and the like, may result in a variety of appearance artifacts including judder, blur, and more.

Judder, also known as jitter or strobing, is a stop/start feeling that a viewer appreciates when viewing a scene and is caused by tracking a moving object on a screen with the eye. Judder results from high contrast edges of a moving object having a stop/start motion caused by a finite framerate. Perceived judder may be increased by higher contrast edges of objects on screen or larger jumps in the stop/start motion and thus is increased with increased brightness and increased velocity of moving objects. For a given amount of motion, lower framerates result in larger amplitudes of the back and forth motion and a lower the frequency, both of which increase amount of perceived judder. Too much judder is distracting to the viewer as the moving objects take on a jolty, stuttering, or vibratory effect. Too little or no judder results in =moving objects being too clear which may distract the attention of the viewer (e.g., the viewer's eye), resulting in a so called Soap Opera Effect which reduces a cinematic feel of the scene.

Many home televisions are equipped with a judder adjustment motion smoothing method, wherein a motion picture or other digitized video media is rendered for display on the home television, in some examples by increasing the framerate as displayed by the home television. These types of methods may reduce judder when viewing media at home, but by an amount that does not reflect the director's intent. In addition, judder adjustment in production of the motion picture itself is not accounted for in such methods.

Judder adjustment during production of the motion picture may be desirable to produce a motion picture with a judder across many scenes with variable motion and other factors according to a director's desired appearance. As is presented in the current disclosure, judder adjustment may be accomplished to produce a consistent judder appearance across scenes and various cinematic and home displays, wherein frame interpolations and phase steps are determined based on a selected judder angle, wherein each judder angle corresponds to a judder level (e.g., amount of perceived judder) and the frame interpolations and phase steps depend on output framerate and framerate conversion. Judder angle may be a linear measure from 0 to 360 degrees that indicates an amount of judder (e.g. a judder level) for a particular scene. The judder angle may allow for adjustment in non-linear, unequal interpolations via a single linear spectrum because, while judder angle indicates the same amount of judder adjustment regardless of output framerate, resultant interpolation phases are determined based on both selected judder angle and framerate conversion between input framerate and output framerate. As will be further described herein, a computing system equipped with a judder adjustment module may determine frame interpolations and phase steps based on a selected judder angle, wherein in some examples, a phase step is the difference between two adjacent interpolation phases or, in other examples, a phase step is a change in phase over a predetermined time period. The computing system may include a user interface that displays a scene of interest and includes a selectable tool (e.g., a dial) through which a user (e.g., a director) may select a judder angle. The judder adjustment module may use the selected judder angle and a known framerate conversion to determine frame interpolations for the scene that generate a corresponding amount of perceived judder.

In some examples, judder angle may be further adjusted from the selected judder angle based on a plurality of parameters of a particular viewing experience (e.g., a display scenario), such as brightness (e.g., in nits) and viewing distance (e.g., resulting in changes in display rate in degrees per second), among others. Each of the plurality of parameters may have a known effect on perceived judder, for example increased brightness increases perceived judder as a logarithmic function. Each particular display scenario may have different parameters, for example a standard dynamic range (SDR) theater may present a motion picture at 48 nits while Premium Large Format (PLF) theaters such as IMAX and Dolby Cinema may present the motion picture at 80 nits or 108 nits, respectively. Therefore, a PLF viewing experience may be brighter than an SDR experience and as such perceived judder for a selected judder angle may differ therebetween.

A method for adjusting the selected judder angle based on one or more of a plurality of parameters particular to a display scenario may include determining a ratio between judder level of the target display scenario and a reference scenario in which the selected judder angle was selected, where the ratio is dependent upon known relationships between judder level and the plurality of parameters. The ratio between target and reference judder levels may then be used to determine an adjusted judder angle from the selected judder angle, wherein the adjusted judder angle provides the same amount of perceived judder under the plurality of parameters of the target display scenario as the selected judder angle does for the reference scenario.

Aspects of the present disclosure are described herein with reference to flowchart illustrations and/or block diagrams of methods, apparatus, and computer program produces according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware, network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Figure 1:
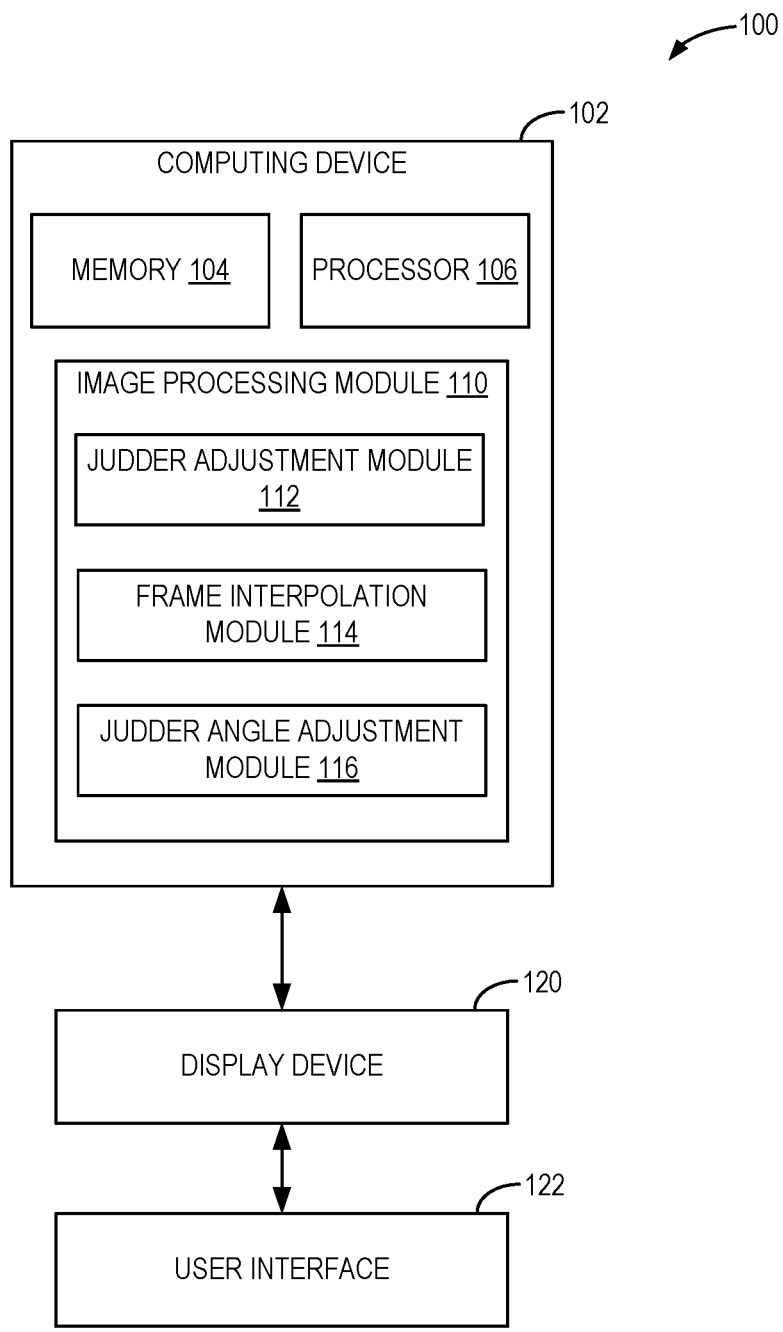
FIG. 1 shows a high-level block diagram illustrating an example image processing system for processing output from a plurality of image frame sources according to an embodiment.
Figure 2:
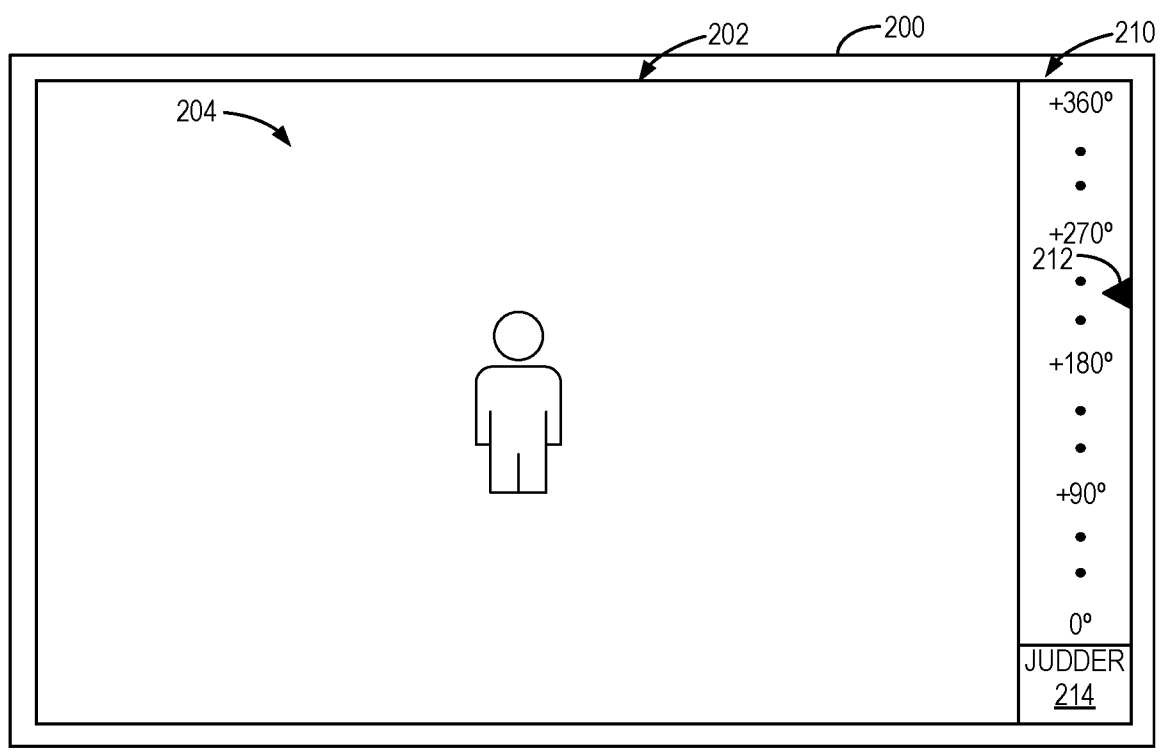
FIG. 2 shows a schematic diagram of a display device and a user interface displayed thereon.

FIG. 1 schematically depicts an example of a computing system 100 comprising a computing device 102 which may include one or more processors 106, volatile and/or non-volatile memory 104 (e.g., random-access memory (RAM) and/or one or more hard disk drives (HDDs)). The memory 104 may store, in some examples, data of one or more scenes of a motion picture or other digitized video. The processors 106 may comprise one or more central processing units (CPUs), graphics processing units (GPUs), and/or one or more image processing modules, such as image processing module 110.

Image processing module 110 may comprise a judder adjustment module 112. The judder adjustment module may be configured to adjust amount of judder of a scene based on an input framerate of the scene, an output framerate, and a selected judder angle, as will be further described below. The judder adjustment module 112 may obtain or otherwise determine the input framerate of a scene stored in the memory 104. The judder adjustment module 112 may then use the selected judder angle, the output framerate, and a framerate conversion between input and output to determine frame interpolation phases and phase steps in order to adjust perceived judder of the scene. A frame interpolation module 114 may interpolate frames between input frames based on the determined frame interpolation phases and phase steps. Input frames may be defined as a current frame, a previous frame, and a next frame. Phase steps may be defined between 0 and 1, and interpolated frames are positioned between initial based on the defined phase steps. Phase steps may be the difference between a current interpolation phase and a previous interpolation phase. For example, for a first interpolation phase of 0.25 and a second interpolation phase of 0.5, the phase step therebetween may be 0.25.

As an example, when converting from a framerate of 24 fps to a framerate of 48 fps with equal phase steps, a single frame may be interpolated halfway between a previous frame and a current frame (for equal phase steps of 0.5) such as to double the number of frames. In some examples, equal phase steps may demonstrate a minimum judder, as will be further described below.

The image processing module 110 may further comprise a judder angle adjustment module 116. The judder angle adjustment module 116 may obtain or determine a selected judder angle for a scene and one or more parameters including brightness, viewing distance, and panning speed (e.g., display rate). Based on the one or more parameters, which may be specific to a target display scenario, such as a type of theater experience (e.g., SDR or PLF), the judder angle adjustment module 116 may adjust the selected judder angle to an adjusted judder angle, from which interpolation phases may be determined for the scene. The adjusted judder angle may differ from the selected judder angle but may maintain the perceived judder of the director's intent as the one or more parameters affect the amount of perceived judder. In this way, the judder angle adjustment module 116 may adjust a judder angle in order to maintain perceived judder for different display scenarios such that the scene, and in turn the major motion picture, has a consistent look across the different display scenarios.

The computing system 100 may further comprise one or more display devices 120, which may comprise any number of visual interface technologies. The one or more display devices 120 may be communicatively coupled to the computing device 102. The one or more display devices 120 may, in some examples, be part of a user device, such as a desktop or laptop computer, a mobile computing device such as a tablet, smart phone, or the like. The user device may include one or more input devices such as a keyboard, a mouse, a touch screen, etc. to allow users to provide input to the computing system 100. The computing system 100 further comprises a user interface 122 that may be displayed by the one or more display devices 120. The one or more display devices 120 may be configured to display one or more scenes of a motion picture or other digitized video media within the user interface 122. The user interface 122, as will be further described with respect to FIG. 2, may display the one or more scenes as well as one or more selectable elements.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

FIG. 2 schematically depicts a display device 200. The display device 200 may be an example of the one or more display devices 120 of FIG. 1 and may be in communication with a computing device that includes volatile or non-volatile memory, one or more processors, and an image processing module including a judder adjustment module as described above.

The display device 200 may display a user interface 202. The user interface 202 may include a display section 204 that displays digitized video media, such as a scene of a major motion picture, for viewing by a user. The display section 204 may comprise a majority of an area of the user interface 202. The user interface 202 may further include one or more spectrums, including a judder angle spectrum 210. The judder angle spectrum 210 may display a plurality of possible judder angles from 0° to +360°. In some examples, not all possible judder angles may be displayed within the judder angle spectrum 210, rather gaps between displayed judder angles may be represented by one or more symbols, such as dots, demonstrating that the spectrum is linear.

The judder angle spectrum 210 may further comprise an input element such as an adjustable dial 212. The adjustable dial 212 may be selectable via user input with a user input device such as a mouse or track pad. The adjustable dial 212 may indicate a selected judder angle when set via user input. For example, an initial judder angle for the scene displayed in the display section 204 may be 0° and the adjustable dial 212 may be initially in line with the displayed 0° judder angle. The adjustable dial 212 may be selected by the user and moved about the judder angle spectrum (e.g., up and down) in order to select different corresponding judder angles.

In some examples, the scene displayed within the display section 204 may be adjusted in real-time (e.g., without intentional time delay) as the selected judder angle is adjusted by movement of the adjustable dial 212. For example, a judder angle of 0° may correspond to a maximum amount of judder and +360° may correspond to a minimum amount of judder. If initially set to 0°, the scene as displayed initially may show a maximum amount of judder. As the adjustable dial 212 is moved up the judder angle spectrum 210 towards the displayed +360° judder angle, the scene as displayed may show less and less judder. The variations in judder of the scene as the selected judder angle is altered may result from frame interpolation phases and phase steps that correspond to each judder angle. For example, frame interpolation phases and phase steps for a selected judder angle of +270° may differ from frame interpolation phases and phase steps for a selected judder angle of +90° and as a result, the scene may show a first amount of judder for the judder angle of +90° and a second amount of judder for the judder angle of +270°. Translation and/or conversion from selected judder angle to frame interpolations/phase steps is further described below.

In some examples, a selected judder angle value 214 may be displayed below the judder angle spectrum 210 to indicate a value of the selected judder angle to which the adjustable dial 212 corresponds. For example, the judder angle spectrum 210 may not display all available judder angle values therein, as described above, and thus the selected judder angle value 214 may be displayed separately for the user. The selected judder angle value 214 may be updated in real-time as the adjustable dial 212 is moved about the judder angle spectrum 210.

While the judder angle spectrum 210 is a linear spectrum, frame interpolations/phase steps that correspond to judder angles may be non-linear/unequal. In this way, the user may be able to alter the amount of perceived judder for a scene to their liking in a linear fashion by simply adjusting the adjustable dial 212. An appearance of the scene may therefore be optimized to the user's intent without demand for the user to choose individual frame interpolations, therefore saving overall time in production of the scene. It should be understood that while the judder angle spectrum 210 and the input element are depicted and described with respect to a vertically aligned spectrum, other configurations of the judder angle spectrum 210 and adjustable dial 212 are possible, such as a horizontally aligned spectrum or a circular spectrum with an associated dial that revolves about a circle rather than moves up and down or side to side. Further, the input element may be selectable or adjustable via other types of inputs, such as voice commands.

Figure 3:
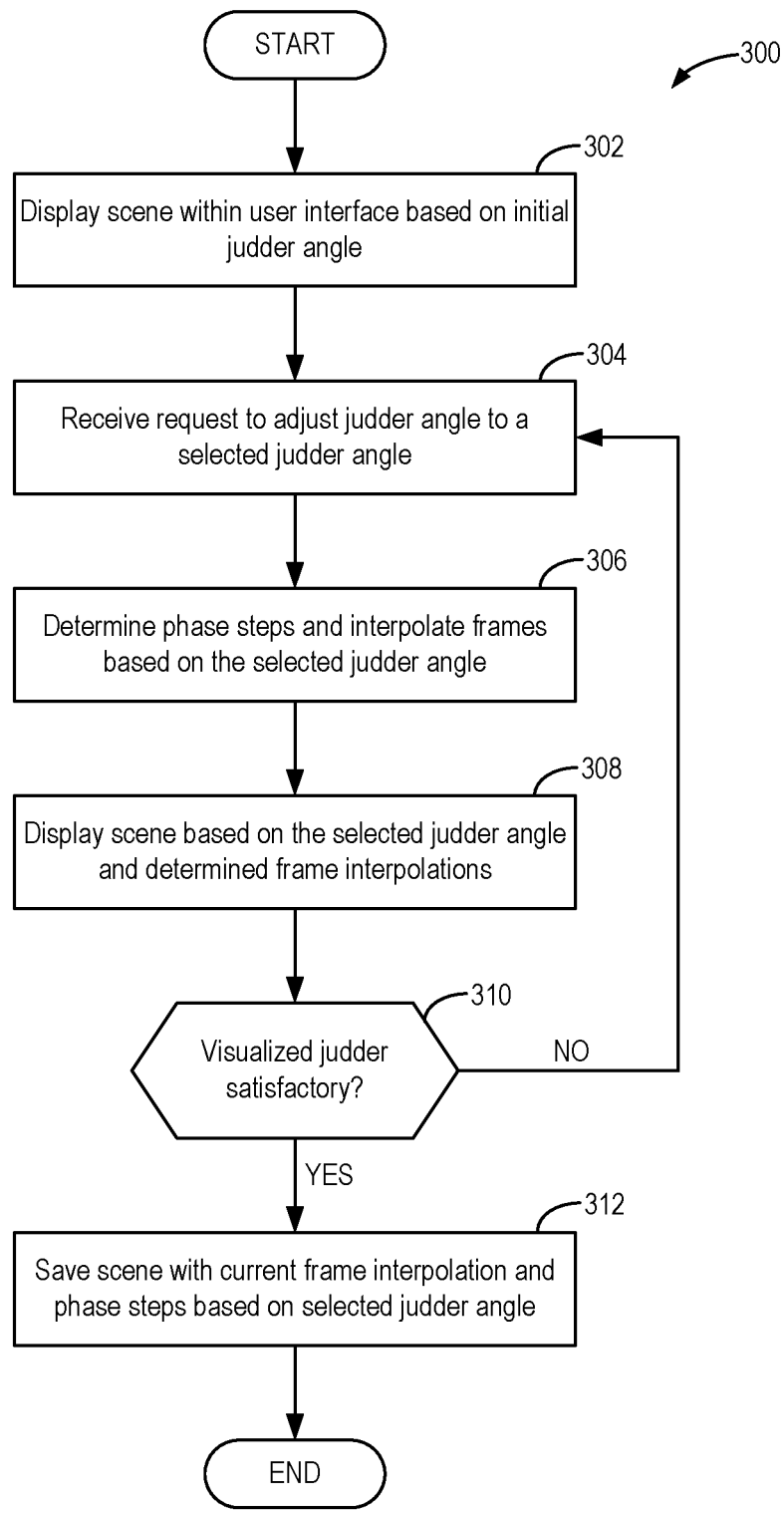
FIG. 3 shows a flowchart illustrating a method for adjusting perceived judder of a scene of a motion picture.

Turning now to FIG. 3, a flowchart illustrating a method 300 for adjusting perceived judder of a scene of a motion picture is shown. The method 300 may be carried out using the systems and components described herein above with regard to FIGS. 1-2. For example, the method 300 may be carried out according to instructions stored in memory of one or more processors of a computing device, such as computing device 102 of FIG. 1, which is communicatively coupled to a display device configured to display a user interface, such as user interface 202 of FIG. 2.

At 302, method 300 includes displaying a scene within a user interface based on an initial judder angle. As is described with respect to FIG. 2, the user interface may comprise a scene display section and a judder angle spectrum with an adjustable dial. The position of the adjustable dial may indicate the judder angle for the scene displayed within the scene display section. The scene may be displayed based on the initial judder angle. In some examples, the initial judder angle may be a predefined judder angle that is selected upon loading the scene for display. In other examples, the initial judder angle may be a previously selected judder angle. The initial judder angle may be a value from 0° to +360°. For example, the initial judder angle may be 0° and the adjustable dial may be in a first position along the judder angle spectrum.

As will be described in greater detail with respect to FIG. 4, a judder angle of 0° may represent maximum perceived judder wherein no judder adjustment is applied and a judder angle of 360° may represent minimum perceived judder wherein maximum judder adjustment is applied.

At 304, method 300 includes receiving a request to adjust the judder angle to a selected judder angle. The request may be a user input whereby the adjustable dial of the judder angle spectrum of the user interface is moved to a second position. The second position of the adjustable dial may be different from the first position. The second position of the adjustable dial may correspond to the selected judder angle. For example, the second position may correspond to a selected judder angle of +180° or any other angle between 0° and +360°.

At 306, method 300 includes determining phase steps and interpolating frames based on the selected judder angle. The selected judder angle may result in a specific maximum range of phase steps (e.g., difference between a largest phase step and a smallest phase step) and the individual phase steps may be specific to an output framerate. A phase step, as previously described, may be a difference between two adjacent interpolation phases. Interpolation phases may be between 0 and 1, where 0 indicates a current or previous input frame and 1 indicates a next or current input frame, respectively. The number of interpolation phases per input frame may be determined by the output framerate compared to the input framerate (e.g., a framerate conversion). Further, frame interpolations may differ for each of the possible judder angles. While the judder angle spectrum is linear, frame interpolations may not be linear. Further details for determining phase steps and interpolation phases for a given judder angle are described with respect to FIG. 4 below. Frame interpolations and corresponding phase steps may affect the amount of perceived judder, wherein phase steps with smaller ranges (e.g., smaller differences between a largest phase step and a smallest phase step) result in less perceived judder.

At 308, method 300 includes displaying the scene within the scene display section based on the selected judder angle and determined frame interpolations. As noted, each of the possible judder angles may result in different frame interpolations and therefore, based on the different frame interpolations, the perceived judder of the scene may differ for each of the possible judder angles. When the selected judder angle is determined by user input, the scene may be displayed with a corresponding perceived judder.

In some examples, display of the scene based on the selected judder angle may occur in real-time with selection of the selected judder angle. Further, in some examples, the perceived judder of the scene may progressively change as the adjustable dial of the judder angle spectrum is moved towards the selected judder angle. As an example, if the adjustable dial is moved from a judder angle of 0° to a judder angle of +180°, which may indicate an overall decrease in the amount of perceived judder, the perceived judder of the scene displayed may progressively decrease as the adjustable dial is moved.

At 310, the method 300 determines if the perceived judder is satisfactory. Determination that the perceived judder is satisfactory, in some examples, may be a subjective determination by the user who is visualizing the scene as displayed based on the selected judder angle. In some examples, perceived judder may be satisfactory if the amount of judder is not distracting while maintaining focus on an intended target of the scene. If the perceived judder is satisfactory (YES at 310), method 300 proceeds to 312. If the perceived judder is not satisfactory (NO at 310), the method 300 returns to 304 to receive a second request to adjust the judder angle to a second selected judder angle. The method 300 then proceeds through the steps as laid out above to again adjust the selected judder angle, frame interpolations, and perceived judder of the scene. In this way, the method 300 may allow for any number of iterations to determine a judder angle that corresponds to a satisfactory perceived judder. In practice, the adjustable dial may be moved an unlimited number of times to selected judder angles as the user determines in real-time the judder angle that provides a satisfactory perceived judder.

At 312, method 300 includes saving the scene to memory with the current frame interpolation and phase steps based on the selected judder angle. In this way, a satisfactory perceived judder may be saved for the scene and when obtained from the memory, the scene may be displayed with the perceived judder as saved. In some examples, the scene saved in memory may be adjusted again for a new judder angle whereby the initial judder angle displayed for the scene may be the selected judder angle of the scene when previously saved.

The method 300 may be performed for one or more scenes of a major motion picture and/or other digitized video media. The scenes may be saved with selected judder angles, wherein selected judder angles for each scene may be different from one another. In some examples, judder for different scenes may vary based on amount of motion, brightness, and/or other parameters and as such, different judder angles may be selected for each scene to create a consistent appearance throughout. In this way, the user (e.g., the director, producer, or cinematographer), may generate the major motion picture or other digitized video media to their intent in a more consistent manner. Further, additional judder adjustments, such as those performed by a judder adjustment method of a home television, may be executed separate from and/or in addition to the judder adjustment method described herein. In this way, the major motion picture may be generated to the user's desired appearance based on the method herein described and then later adjusted for different displays like a home television.

Turning now to FIG. 4, a flowchart illustrating a method 400 for determining frame interpolations and phase steps based on a selected judder angle is shown. Method 400 may be a part of method 300 described with reference to FIG. 3, specifically at 306. Method 400 may be carried out using the systems and components described herein above with regard to FIGS. 1-2. For example, the method 400 may be carried out according to instructions stored in memory of one or more processors of a computing device, such as computing device 102 of FIG. 1, that is communicatively coupled to a display device configured to display a user interface, such as user interface 202 of FIG. 2.

At 402, method 400 includes determining an input framerate and input frames of a scene. The scene may be shot with a camera at a defined framerate, such as 24 fps. The scene, as stored in memory, may have known data of the framerate. The scene, as stored in memory, may also have known input frames, including, as described previously, a previous frame, a current frame, and/or a next frame depending on which frame is currently being analyzed or viewed. New frames, as will be further described, may be interpolated between the input frames at defined interpolation phases based on a selected judder angle.

At 404, method 400 includes determining the output framerate. The output framerate may be the framerate to which the input framerate is converted during interpolation. The output framerate may be inputted by the user and/or known based on an intended display scenario. For example, different theaters may display a major motion picture at different framerates and therefore the output framerate may be dependent on a theater scenario (e.g., high framerate format theater, IMAX theater, etc.). Output framerate vs input framerate and the framerate conversion thereof may determine how many new frames are to be interpolated for a given input frame. As an example, an output framerate of 48 fps converted from an input framerate of 24 fps may have a framerate conversion of 2:1 resulting in phase steps of 0.5 when equal phase steps are used. As another example, an output framerate of 120 fps converted from an input framerate of 24 fps may have a framerate conversion of 5:1 resulting in phase steps of 0.2 when equal phase steps are used. As such, the framerate conversion may be a ratio of the output framerate to the input framerate, wherein the number of interpolated frames is based on the ratio. For example, a framerate conversion ratio of 5 (e.g., 5:1) indicates four interpolated frames per input frame and a framerate conversion ratio of 3 indicates two interpolated frames per input frame.

At 406, method 400 includes determining the selected judder angle. The selected judder angle may be selected via user input to an adjustable dial (e.g., adjustable dial 212) of a judder angle spectrum of a user interface as described with respect to FIGS. 2 and 3. A judder angle to which the position of the adjustment dial corresponds may be the selected judder angle. A judder angle of 0° may indicate maximum perceived judder for the scene and a judder angle of +360° may indicate minimum perceived judder for the scene. Maximum perceived judder may indicate that no judder adjustment is applied and minimum perceived judder may indicate that full judder adjustment is applied. Thus, perceived judder may decrease as judder angle increases.

At 408, method 400 includes determining phase steps and interpolation phases based on the selected judder angle. The difference between a largest phase step and a smallest phase step (e.g., a maximum range of phase steps) for frame interpolations of an input frame may have a relationship to judder angle, demonstrated by equation (1):

$$JA = 360 \times (1 - (PS_{max} - PS_{min})) \quad (1)$$

where JA is the judder angle in degrees, $PS_{max}$ is the largest phase step, and $PS_{min}$ is the smallest phase step.

In some examples, the range ($PS_{max}$-$PS_{min}$) may be determined based on the judder angle and the individual phase steps may be determined based on the output framerate (e.g., based on framerate conversion), wherein, as described by equation (2):

$$360 = 360PS_{max} + 360PS_{min}(n-1) \quad (2)$$

where n is framerate conversion value, which may be a quotient of output framerate and input framerate.

Via equations (1) and (2), each of the $PS_{min}$ and $PS_{max}$ may be determined individually, as described in equations (3) and (4):

$$PS_{min} = \frac{JA}{360n} \quad (3)$$

$$PS_{max} = \frac{360 - \left(\frac{(n-1)}{n}\right)(JA)}{360} \quad (4)$$

where the variables are as defined above.

As an example, for a selected judder angle of +180°, the range ($PS_{max}$-$PS_{min}$) may be determined to be 0.5, based on equation (1). The range of 0.5 may be the same for different output framerates but may indicate different phase steps and interpolation phases depending on output framerate and framerate conversion. For example, for an output framerate of 120 fps converted from an input framerate of 24 fps, the largest phase step may be 0.6 and the smallest phase step may be 0.1 based on equations (3) and (4), while for an output framerate of 48 fps converted from the input framerate of 24 fps, the largest phase step may be 0.75 and the smallest phase step may be 0.25 based on equations (3) and (4).

Per equation (1), a selected judder angle of +360° may result in a range of 0, indicating that all the phase steps are equal to each other (e.g., the largest phase step and the smallest phase step are the same). A selected judder angle of 0° may result in a range of 1, indicating that all phase steps are 0 and each of the interpolated frames repeats a respective input frame which leaves a phase step equal to 1 representing the jump to a new input frame (e.g., next input frame).

In some examples, interpolation phases for the output framerate may be determined based on the determined $PS_{min}$ and $PS_{max}$, wherein each of the phase steps are equal to the $PS_{min}$ except one unequal phase step per input frame that is equal to $PS_{max}$ that is larger than the other phase steps. The one unequal phase step may be furthest from both of the original input frames (e.g., a middle phase step) and as such, with the known output framerate, the interpolation phases may be determined. Further, a number of interpolated phases may be (n−1) and thus a number of phase steps therebetween may be (n−2). The difference between the current original input frame and the first interpolation phase as well as the difference between the last interpolation phase and the next original input frame may be equal to the smallest phase step, for a total number of phase steps equal to n. As an example, for a $PS_{min}$ of 0.1 and a $PS_{max}$ of 0.6, as is for a framerate conversion of 5 and a selected judder angle of +180°, the phase steps may be 0.1, 0.1, 0.6, 0.1, and 0.1 which results in interpolation phases of 0.1, 0.2, 0.8, and 0.9 between a current original input frame and a next original input frame. Further, a sum of all phase steps per an input frame may be equal to 1. For example, in the example presented, the phase steps of 0.1, 0.1, 0.6, 0.1, and 0.1 summed equal 1.

In some examples, a number of phase steps may be even and thus the unequal phase step may be closer to one of the input frames than the other, though the equal, smaller phase steps may still be closer to the input frames than the unequal phase step. In some examples, such as with symmetric interpolation phases, phase steps may be in terms of a predetermined time period, wherein a phase step is a change in phase over the predetermined time period. In some examples, the predetermined time period may be equal to the output framerate. In other examples, the predetermined time period may be a multiple of the output framerate. For example, in a conversion between 24 fps and 48 fps, the predetermined time period may be ⅟₄₈ seconds.

Further, in some examples, framerate conversion may be performed more than once for a given selected judder angle, such that phase steps and interpolation phases are determined for a first conversion and then determined again for a second conversion. For example, in converting from 24 fps to 96 fps, a first conversion from 24 fps to 48 fps may be performed with a first determined set of phase steps and then a second conversion from 48 fps to 96 fps may be performed with a second set of determined phase steps. The second set of determined phase steps in this example may differ from determined phase steps from a single framerate conversion from 24 fps to 96 fps for the selected judder angle. Which option is chosen may depend on effects on image quality, latency, and more. In some examples, a first conversion may be for a first judder angle and a second conversion may be for a different, second judder angle, wherein the average of the first and second judder angles equals the selected judder angle.

At 410, method 400 includes interpolating frames based on the determined phase steps and interpolation phases. New frames may be interpolated for each input frame at each of the determined interpolation phases with phase steps therebetween. As an example, for phase steps of 0.1, 0.1, 0.6, 0.1, and 0.1 determined for a selected judder angle of +180°, frames may be interpolated at phases 0.1, 0.2, 0.8, and 0.9, wherein each phase step is a difference between a previous interpolation phase and a current interpolation phase, as is described above.

Each judder angle for a specified output framerate may translate to different interpolation phases as herein described, and different, in some examples unequal, phase steps may alter perceived judder. Larger ranges of phase steps may result in more perceived judder than smaller ranges, wherein per equation (1), the selected judder angle has a relationship with the range of phase steps and therefore may be used to adjust perceived judder. In this way, perceived judder of each scene of a major motion picture may be altered to the user's desired appearance during production. Judder adjustment in this manner during production may also allow for further adjustment based on brightness, viewing distance, or other parameters as is further described below, as well as for application of additional judder adjustment methods such as those implemented by home televisions.

The examples presented above relate to scenarios in which the output framerate is higher than the input framerate. In some instances, the input framerate may be a high framerate (e.g., 120 fps) rather than a smaller framerate like 24 fps. Film shot at 120 fps may result in the Soap Opera Effect. In such examples, a smaller framerate may be reached by dropping or combining original frames. For example, to convert from 120 fps to 24 fps, four out of every five original input frames may be dropped. The content may be converted back to 120 fps (or other higher framerate) with frame interpolations using, at least in part, the dropped original input frames based on a selected judder angle.

In terms of steps of the method 400, at 402, the input framerate and input frames may be determined as described above. At 404, the output framerate may be determined. In some examples, the output framerate may be the same as the input framerate and an intermediary framerate that is lower than the input framerate may also be determined. At 406, a selected judder angle may be determined. The selected judder angle may determine a model of phase steps and interpolation phases to use when converting from the intermediary framerate to the output framerate. At 408, phase steps and interpolation phases may be determined based on the selected judder angle for the output framerate (compared to the intermediary framerate). Finally, at 410, frames may be interpolated based on the determined phase steps and interpolation phases. One or more of the frames that are interpolated may be of the original input frames and one or more of the frames that are interpolated may be new frames.

As an example, an input framerate may be 120 fps with input frames of A, B, C, D, E and F, an intermediary framerate may be 24 fps, and an output framerate may be 120 fps. A selected judder angle may be 180°. When determining interpolation phases and phase steps, phase steps may be unequal, similar to when interpolating new frames described above. The interpolation frames, rather than being labeled at phases 0.1, 0.2, 0.8, and 0.9, as would be when converting from 24 fps to 120 fps for a judder angle of 180°, may be labeled based on the original input frames. The dropped original frames can be considered to be located at phases 0.2, 0.4, 0.6 and 0.8 (e.g., modeled after equal phase steps for a 24 fps to 120 fps conversion). The interpolation phases and phase steps may be modeled after interpolation phases and phase steps determined by equations (1), (2), (3), and (4), which result in phase steps of 0.1, 0.1, 0.6, 0.1, and 0.1 and interpolation phases of 0.1, 0.2, 0.8, and 0.9 for a conversion from 24 fps to 120 fps at a judder angle of 180°. To obtain an interpolation phase of 0.1 relative to the 24 fps intermediary framerate, the original frames may be used. To get the 0.1, interpolating half way between a frame located at phase 0.2 and a frame located at 0 results in a frame located at phase 0.1. Therefore phase 0.1 between A and F is equivalent to phase 0.5 between A and B. The resulting interpolation frames may therefore be a 0.5 phase between A and B, B, E, and a 0.5 phase between E and F.

Interpolating based on the original input frames for at least some of the interpolated frames may reduce the number of frames interpolated there between, and therefore the frames interpolated from the original input frames may have a higher image quality as they are captured closer together in time. Thus, judder adjustment as described herein may be used to add a cinematic look to content captured at higher framerates and allows for a mixture of capture rates to be used to produce the cinematic look.

Turning now to FIG. 5, a graph 500 demonstrating a use case scenario for determining interpolation phases for an input frame based on one or more selected judder angles is shown. An abscissa of the graph 500 may indicate defined phase input between adjacent input frames A and B (e.g., values of x for equation (2)). In one example, the input frame A is a current input frame A and the input frame B is a next input frame B. An ordinate of the graph 500 may indicate interpolation phases for given judder angles. The current input frame (e.g., current input frame A) may have a value of 0 and the next input frame (e.g., next input frame B) may have a value of 1, wherein interpolation phases between the current input frame and the next input frame have a value between 0 and 1.

Different judder angles are represented within the graph 500 by lines of different slopes (each line illustrated with a different dash pattern for ease of visualization). A first line 502 may correspond to a judder angle of +360°. Second lines 504 may correspond to a judder angle of +180°. Third lines 506 may correspond to a judder angle of +90°. Fourth lines 508 may correspond to a judder angle of 0°. Each of the lines of the graph 500 may be described by equation (5), $$y = mx + b \qquad (5)$$

where y is the interpolation phase, m is a slope of a line corresponding to the selected judder phase, x is a defined phase input between adjacent input frames, and b is a y-intercept of the line. In some examples, the slope m for the selected judder angle may be given by equation (6):

$$m = \frac{JA}{360} \qquad (6)$$

where the variables are as defined above. In some examples, equations (5) and (6) may be used to determine interpolation phases if a framerate conversion is known and the defined phase inputs are equal to interpolation phases if equal phase steps are used. Based on equation (6), the first line 502 may have a slope of 1, the second lines 504 may have a slope of 0.5, the third lines 506 may have a slope of 0.25, and the fourth lines 508 may have a slope of 0.

Each of the second, third, and fourth lines 504, 506, and 508 may comprise a line for each input frame. For example, the second lines 504 may comprise a current frame line 510 and a next frame line 512. The current frame line and the next frame line for each of the second, third, and fourth lines 504, 506, and 508 may have the same slope but different y-intercepts, therefore resulting in different interpolation phases (e.g., y of equation (5)). The y-intercept may depend on which of the lines is used. For example, for x values between 0 and 0.5, the y-intercept may be 0 while for x values between 0.5 and 1, the y-intercept may be 1-m. Thus, interpolation phases determined by equation (5) from 0 to 0.5 (e.g., halfway between the current and next input frames) may be based on the first of the lines with an intercept b of 0 and interpolation phases determined by equation (5) from 0.5 to 1 may be based on the second of the lines with an intercept b of 1-m.

As noted, in determination of interpolation phases, x-coordinates may be defined based on conversion between an input framerate and an output framerate. For example, for an input framerate of 24 and an output framerate of 120, which defines a framerate conversion of 5, x-coordinates between current input frame A and next input frame B may be defined at 0.2, 0.4, 0.6, and 0.8, as is such for the use-case scenario shown in FIG. 5. Y-coordinates may be defined based on the slope and y-intercept of a line corresponding to the selected judder angle, as indicated by equation (5).

In the use-case scenario presented in the graph 500, using equation (5), for an x-coordinate of 0.2, a y-coordinate (e.g., an interpolation phase) for a judder angle of +360° may be 0.2 as the slope of the line 502 is 1 and the y-intercept is 0. For an x-coordinate of 0.6, a y-coordinate for a judder angle of +180° may be 0.8 as the slope of the next frame line 512 of the lines 504 is 0.5 and the y-intercept is 0.5 (e.g., 1-m when m=0.5).

Because there are at least two lines defined for each judder angle, as described above, the phase steps determined for the selected judder angle may be unequal when the selected judder angle is less than +360° and greater than 0°. Unequal phase steps generated by a selected judder angle may comprise all equal phase steps except for one unequal phase step per input frame. The equal phase steps may be steps generated from just one of the at least two lines (e.g., steps between interpolation phases generated for one of the lines), while the step in transition between the first and second lines may not be equal to the other phase steps. The unequal phase step may occur furthest from both of the input frames (e.g., the current input frame and the next input frame or the previous input frame and the current input frame) as the transition between the first and second lines occurs at the midpoint between input frames.

For example, interpolation phases for a judder angle of 180° and a framerate conversion of 5 determined based on equation (5) and presented in the graph 500 may be 0.1, 0.2, 0.8, and 0.9. The phase steps between the interpolation phases may be 0.1, 0.6, and 0.1. As such, the phase steps are equal (e.g., 0.1) except for one larger phase step (e.g., 0.6) which occurs in the middle, furthest from both of the input frames. Thus, the graph 500 and the lines thereof, described by equations (5) and (6), may describe the equations (1), (2), (3), and (4) referenced with respect to FIG. 4. Each judder angle may result in a particular amount of perceived judder for a given display scenario irrespective of output framerate and the unequal phase steps generated based on the output framerate allow for the particular amount of perceived judder to be maintained for a specified judder angle across various output framerates and/or framerate conversions, as will be further described with respect to FIG. 7.

Turning now to FIG. 6, a flowchart illustrating an example method 600 for adjusting a selected judder angle based on one or more parameters of a target display scenario is shown. The method 600 may be carried out using the systems and components described herein above with regard to FIGS. 1-2. For example, the method 600 may be carried out according to instructions stored in memory of one or more processors of a computing device, such as computing device 102 of FIG. 1. Further, the method 600 may be performed in conjunction with methods 300 and/or 400 of FIGS. 3 and 4.

At 602, method 600 includes obtaining a selected judder angle for a scene. As is described in greater detail with respect to method 300, the selected judder angle may be determined based on one or more user inputs to an adjustable dial of a user interface (e.g., adjustable dial 212 of user interface 202). The selected judder angle may be saved to memory for the scene and may be obtained by a judder angle adjustment module of an image processing module (e.g., image processing module 110) of the computing device, as is described with respect to FIG. 1. The selected judder angle may be selected for a given reference display scenario. The reference display scenario may be, in some examples, modeled after a display scenario such as SDR and as such may have parameters such as brightness, panning speed, and the like particular to the display scenario. The reference display scenario, in other examples, may be the display device via which the scene is displayed during selection of the selected judder angle. The reference display scenario may be predefined and the judder angle may determine judder levels with respect to parameters thereof.

At 604, method 600 includes obtaining one or more parameters for a target display scenario. In some examples, the one or more parameters may be determined based on the obtained target display scenario, wherein the target display scenario is obtained via user input. As an example, the target display scenario may be determined based on selection of a display scenario from a list of possible display scenarios and may have one or more known parameters thereof that may be obtained from memory. The one or more parameters may comprise screen brightness (e.g., in nits), viewing distance, panning speed (or pan time), and the like and in some examples may differ from the one or more parameters of the reference display scenario. The one or more parameters may each have a known or otherwise determinable effect on and/or relationship with judder level (e.g., amount of perceived judder). For example, increase in brightness may result in increased perceived judder. In this way, with known relationships between each of the parameters and perceived judder, as well as known relationships between different parameters in some examples, the judder angle may be adjusted for one or more given parameters to maintain the director's intended perceived judder.

At 606, method 600 includes determining an adjusted judder angle based on the one or more parameters and the selected judder angle. Each of the one or more parameters may have a known relationship with judder level. For example, judder level may be a log function of brightness, as described by equation (7):

$$J = \left(\frac{P_s}{5}\right) \times \left(1.972\log_{10}\left(\frac{L_t}{L_r}\right) + 1\right) \quad (7)$$

where J is judder level, $P_s$ is panning speed in degrees per second, $L_t$ is peak luminance of the display scenario (e.g., the target display), and $L_r$ is luminance of the reference display (e.g., the peak luminance as displayed by the display device on which the selected judder angle is selected). In some examples, peak luminance may be used for luminance. In other examples, average picture level (APL) may be used for luminance or luma at a region of the image may be used for luminance. If luma at a region is used, multiple judder levels may be determined, one for each region, and an average of the multiple judder levels may ultimately be defined. Additionally, in some examples, judder may be determined between two adjacent frames, whereby equation (7) is modified to replace ($L_t/L_r$) with ($\Delta L_t/\Delta L_r$) where $\Delta L$ is an average of the absolute value of the per pixel delta luminance or the root mean square of the per pixel delta luminance between adjacent frames.

Further, viewing distance may have a known effect on judder level, wherein changing the viewing distance increases the amount of perceived judder by the square of the distance. Viewing distance may be related to panning speed as well.

With each of the known relationships between specified parameters and judder level, a ratio between a target judder level and a reference judder level may be determined, as noted at 608. The ratio between the target judder level and the reference judder level is given by equation (8):

$$\frac{J_t}{J_r} = \left(\frac{D_r}{D_t}\right)^2 \times \left(1.972\log_{10}\left(\frac{L_t}{L_r}\right) + 1\right) \quad (8)$$

where $J_t$ is judder level of the target display scenario, $J_r$ is judder level of the reference display, $D_r$ is viewing distance of the reference display, and $D_t$ is viewing distance of the target display scenario.

Other parameters may also be considered, such as the human visual system and ambient light. For example, perceived judder may be affected by presence of a face in a scene. Perceived judder may also be affected by ambient light in addition to display brightness. Therefore parameters such as "content" (e.g., whether or not there are faces in the scene), cumJND (function of display brightness and ambient light conditions) may be factored into the equations, resulting in different version of equation (8). Additionally, regions may be given weights based on ranges of color or luma (or luminance) values in the picture, which may also result in variations to equation (8).

A target judder angle may then be determined based on the determined ratio between target judder level and reference judder level, as noted at 610. The target judder angle may be defined by equation (9):

$$JA_t = 360 - (360 - JA_r)\left(\frac{J_t}{J_r}\right) \quad (9)$$

where $JA_t$ is the judder angle for the target display scenario (e.g., the adjusted judder angle) and $JA_r$ is the judder angle for the reference display (e.g., the selected judder angle).

In this way, differences in one or more parameters (e.g., viewing distance and/or brightness) and their respective effects on perceived judder may be accounted for when determining the adjusted judder angle. As an example, for a brightness level parameter of the target display scenario that is more than the brightness level of the reference display, the adjusted judder angle may be increased from the selected judder angle, per equations (7), (8), and/or (9) to maintain the same perceived judder as set by the selected judder angle under the reference display scenario.

At 612, method 600 includes interpolating frames of the scene based on the adjusted judder angle. As is described with respect to method 400, the scene may have a known framerate conversion (e.g., ratio of input framerate to an output framerate). Interpolation of frames based on the adjusted judder angle may comprise determining phase steps and interpolation phases based on equations (3) and (4), as described above, wherein the range of phase steps determined from the interpolation phases has a relationship with the adjusted judder angle, as described by equation (1). In this way, for the output framerate and the adjusted judder angle, interpolation phases may be determined and frames may be interpolated between input frames at those interpolation phases.

The adjusted judder angle may result in different interpolation phases than the selected judder angle, but because of the one or more parameters, the adjusted judder angle may compensate for effects on perceived judder from the one or more parameters and ultimately result in the same amount of perceived judder in the target display scenario as the selected judder angle in the reference display scenario. In this way, the adjusted judder angle compensates for differences in brightness, panning speed, etc. that may result from different display scenarios. As such, the director's intent, which is initially tuned via the selected judder angle, may be maintained for various display scenarios that alter judder based on parameters like brightness and panning speed.

At 614, method 600 includes saving and/or displaying the scene in the target display scenario with the interpolated framed as determined based on the adjusted judder angle. The scene may be saved to memory according to the adjusted judder angle and the target display scenario such that the scene may be displayed in the target display scenario with the perceived judder determined by the adjusted judder angle.

Method 600 may be performed for a scene, as is herein described, or for multiple scenes of a major motion picture. In some examples, all scenes of the major motion picture may undergo judder angle adjustment for the target display scenario, though judder angle for each scene may be adjusted individually given that selected judder angles may be specific to individual scenes. Further, method 600 may be repeated for the major motion picture for various target display scenarios with different parameters. For example, a selected judder angle for a scene of a major motion picture may be determined based on method 300, as described above. The selected judder angle may then be adjusted to a first adjusted judder angle for a first display scenario and, separately, to a second adjusted judder angle for a second display scenario. The first adjusted judder angle may differ from the second adjusted judder angle when at least one of the parameters for the first display scenario differs from the second display scenario (e.g., the display scenarios have different brightness levels).

In this way, a major motion picture that is tuned to the director's intent for perceived judder via selection of judder angles for scenes may be adjusted for various display scenarios such as different theater formats while maintaining the director's intended perceived judder.

FIG. 7 demonstrates, via a plurality of graphs demonstrating an edge of a moving object of a scene, how alterations in judder angle and frame interpolations result in changes in amount of perceived judder. For each of the graphs, position of the edge is depicted on the abscissa, increasing from left to right, and time increases in the direction of the arrow of the ordinate. A first graph 700 depicts a first scenario of a moving edge at 24 fps for a judder angle of 0°. A second graph 702 depicts a second scenario of the moving edge at 48 fps, in some examples converted from 24 fps, for a judder angle of +360°. A third graph 704 depicts a third scenario of the moving edge at 48 fps, in some examples converted from 24 fps, for a judder angle of +180°. A fourth graph 706 depicts a fourth scenario of the moving edge at 96 fps, in some examples converted from 24 fps, for a judder angle of +180°. A fifth graph 708 depicts a fifth scenario of the moving edge at 24 fps with the velocity of the moving object reduced by half.

An amount of perceived judder for the first graph 700 may be approximated by an area 714 for each of a first frame 710 and a second frame 712. As shown in the first graph 700, the position of the edge returns to its original position at the start of the second frame 712. A judder angle for the first scenario may be 0°, such that no judder adjustment is applied and the amount of perceived judder represented by the area 714 may be at its largest. In comparison, the amount of perceived judder for the second graph 702 where full judder adjustment is applied (as indicated by the judder angle of +360°) may be negligible, as denoted in the second graph 702 by empty areas 715. The judder of 48 fps and higher content is consider negligible and is therefore ignored in all the graphs. As is shown, a number of frames in the second graph 702 may be twice that of the number of frames in the first graph 700. The judder angle of +360°, as described previously, results in equal phase steps, whereby a first phase step between a first frame 716 and a first interpolation frame 718 is the same as a second phase step between the first interpolation frame 718 and a second frame 720.

While the amount of perceived judder may be at its largest for a judder angle of 0°, as demonstrated by the first graph 700, and at its smallest (e.g., negligible) for a judder angle of +360°, as demonstrated by the second graph 702, the amount of perceived judder may be half that of the largest amount for a judder angle of +180°, as shown in the third graph 704.

The fourth graph 706 demonstrates that the amount of perceived judder for a specified judder angle is independent of output framerate despite phase steps and interpolation phases differing by output framerate. For example, the fourth scenario depicted by the fourth graph 706 has the same judder angle of +180° as the third graph 704, but twice the framerate at 96 fps. The number of interpolated frames per input frame may be one in the third scenario but three in the fourth scenario. Unequal phase steps may result from the judder angle of +180°, wherein small phase steps occur closest to input frames 726, 730 and a larger phase step occurs furthest from the input frames 726, 730. The amount of perceived judder for the judder angle of +180°, represented by areas 738 in the third graph 704 and areas 746 in the fourth graph 706, each of which may be half the area 714 of the first graph 700, may be half that of the amount of perceived judder for the judder angle of 0°.

An alternative method of generating the 96 fps content is to first generate the 48 fps content based on the selected judder angle and then frame doubling from 48 fps to 96 fps by repeating the 48 fps frames. This suggests that interpolation phases of the 96 fps content of 0.125, 0.25, and 0.875 are equivalent to phases of 0.25, 0.25 and 0.75. In the above discussion, the phase steps were determined by the output framerate. That is, in the 48 fps case, the phase step was determined by measuring the change in phase over a period of $\frac{1}{48}$ seconds and for the 96 fps case $\frac{1}{96}$ sec. The alternative method of measuring phase steps can be based on the change in phase over a fixed time period. For example, if the fixed time period is $\frac{1}{48}$ seconds, the phase steps for the 96 fps and 48 fps output rates are the same. It should also be obvious, that while the above uses a time period that is an integer multiple of the output frame rate, an intermediate frame rate higher than the output frame rate could be generated and then frames dropped to create the output frame rate. Therefore, the time period for measuring the phase steps can be based on the intermediate framerate, which allows the time period for measurement to be any value.

As the number of interpolated frames per input frame may be greater in the fourth graph 706 than the third graph 704, small phase steps of the fourth graph 706 may be smaller than small phase steps of the third graph 704 and the larger phase step of the fourth graph 706 may be smaller than the large phase step of the third graph 704. Even with the differences in phase steps, the areas 746 representing an amount of perceived judder for the fourth graph 706 may be approximately equal (e.g., within ±5%) to the areas 738 representing the amount of perceived judder for the third graph 704. As such, each judder angle translates to a defined amount of perceived judder for a given display scenario irrespective of the output framerate. Any actual differences in areas between output framerates may be perceived as differences in sharpness rather than differences in judder.

Further, velocity may also have an effect on amount of perceived judder. For the first graph 700, the moving object represented therein may have a first velocity (e.g., quotient of change in position and change in time). In the fifth graph 708, which demonstrates the same frames as the first graph 700 with a judder angle of 0° and a framerate of 24 fps, the moving object represented therein may have a second velocity that is half the first velocity. This is demonstrated in the fifth graph 708 by frames 748 and 750 changing position half as much for a given amount of time as in the first graph 700. An area 752 representing amount of perceived judder may be half that of the area 714 of the first graph, demonstrating that judder is directly proportional to velocity of the moving object, wherein decreasing the velocity decreases the amount of perceived judder.

In this way, as demonstrated by the graphs described above, alterations in judder angle for a given scene with defined frames may result in changes to amount of perceived judder. In order to accomplish the amount of perceived judder indicated by a judder angle, interpolation phases for a given output framerate may be determined, as described previously. Thus, a user of a computing system equipped with instructions in memory as described above, may modify perceived judder of a scene to their desired appearance by changing a judder angle for the scene, which may be a linear spectrum adjustable via a dial of an interface.

A technical effect of the systems and methods presented herein is that perceived judder for a major motion picture may be defined for multiple scenes to a director's intent easier and faster via selection and/or user modification of a judder angle. Each judder angle may indicate an amount of perceived judder (e.g., a judder level) for a scene and the scene may be displayed with the amount of perceived judder for viewing. Further, the selected judder angle may be adjusted for different display scenarios with parameters that affect perceived judder to maintain the director's intent for various display scenarios.

The disclosure also provides support for a system, comprising: a display device configured to display one or more scenes of a major motion picture and a user interface, wherein the user interface comprises an input element for a judder angle spectrum, and a computing device including a processor communicatively coupled to the display device, wherein the computing device is configured to execute instructions stored in non-transitory memory that, when executed, cause the processor to: display a scene on the display device, wherein the scene comprises a plurality of input frames at an input framerate, interpolate one or more frames for one or more of the plurality of input frames based on a selected judder angle, wherein the selected judder angle is selected via the input element of the user interface, and display the scene with a perceived judder resulting from interpolation of one or more frames. In a first example of the system, the selected judder angle corresponds to a position of the input element along the judder angle spectrum and the selected judder angle is selected via user input to the input element. In a second example of the system, optionally including the first example, the computing device is configured to execute further instructions stored in non-transitory memory that, when executed, cause the processor to adjust the selected judder angle based on one or more parameters of a target display scenario, wherein the adjusted judder angle corresponds to the perceived judder for the one or more parameters and the selected judder angle corresponds to a reference display scenario, and the one or more parameters include brightness, panning speed, and viewing distance. In a third example of the system, optionally including one or both of the first and second examples, adjusting the selected judder angle comprises determining an adjusted judder angle based on a ratio between a first judder level of the target display scenario and a second judder level of the reference display scenario, wherein the first judder level depends on the one or more parameters. In a fourth example of the system, optionally including one or more or each of the first through third examples, the computing device is configured to execute further instructions stored in non-transitory memory that, when executed, cause the processor to save the scene with the selected judder angle and resulting frame interpolations and perceived judder thereof. In a fifth example of the system, optionally including one or more or each of the first through fourth examples, the judder angle spectrum is a linear spectrum.

The disclosure also provides support for a method, comprising: determining a selected judder angle for a scene of a major motion picture, determining phase steps and interpolation phases for the scene based on the selected judder angle and a framerate conversion, wherein the selected judder angle has a relationship to a range of phase steps and the framerate conversion is a ratio between input framerate and output framerate, interpolating frames between input frames of the scene based on the determined phase steps and interpolation phases, and saving the scene with the interpolated frames. In a first example of the method, the range of phase steps is a difference between a largest phase step and a smallest phase step. In a second example of the method, optionally including the first example, the largest phase step is positioned furthest from the input frames and one or more smallest phase steps are positioned closest to the input frames. In a third example of the method, optionally including one or both of the first and second examples, the phase steps are equal phase steps except for one unequal phase step per input frame and a number of phase steps depends on the framerate conversion, wherein the one unequal phase step is the largest phase step and the equal phase steps are proportional to the selected judder angle and the framerate conversion. In a fourth example of the method, optionally including one or more or each of the first through third examples, the phase steps are based on a change in phase over a predetermined time period. In a fifth example of the method, optionally including one or more or each of the first through fourth examples, the predetermined time period is a multiple of the output framerate. In a sixth example of the method, optionally including one or more or each of the first through sixth examples, the selected judder angle corresponds to a particular judder level irrespective of the framerate conversion. In a seventh example of the method, optionally including one or more or each of the first through seventh examples, the method further comprises: adjusting the selected judder angle to an adjusted judder angle based on one or more parameters of a target display scenario, wherein the adjusted judder angle differs from the selected judder angle and the adjusted judder angle, for the target display scenario, corresponds to the particular judder level.

The disclosure also provides support for a method, comprising: obtaining a selected judder angle for a scene of a major motion picture via user input, obtaining one or more parameters of a target display scenario, automatically adjusting the selected judder angle to an adjusted judder angle based on the one or more parameters, interpolating frames between input frames of the scene based on the adjusted judder angle and an output framerate, and saving the scene to memory. In a first example of the method, the selected judder angle is obtained via user input to a user interface through which the scene is displayed, wherein the user input comprises movement of an adjustable dial. In a second example of the method, optionally including the first example, the one or more parameters include screen brightness, viewing distance, and panning speed. In a third example of the method, optionally including one or both of the first and second examples, the method further comprises: obtaining one or more second parameters of a second target display scenario and adjusting the selected judder angle to a second adjusted judder angle based on the one or more second parameters. In a fourth example of the method, optionally including one or more or each of the first through third examples, adjusting the selected judder angle comprises determining a ratio between a target judder level and a reference judder level based on known relationships between the one or more parameters and judder level, wherein judder level is an amount of perceived judder. In a fifth example of the method, optionally including one or more or each of the first through fourth examples, adjusting the selected judder angle further comprises determining the adjusted judder angle based on the determined ratio between the target judder level and the reference judder level.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a display device configured to display one or more scenes of a video media and a user interface, wherein the user interface comprises an input element for a judder angle spectrum; and
    a computing device including a processor communicatively coupled to the display device, wherein the computing device is configured to execute instructions stored in non-transitory memory that, when executed, cause the processor to:
        display a scene on the display device, wherein the scene comprises a plurality of input frames at an input framerate;
        determine a selected judder angle via user input to the input element of the user interface, wherein the selected judder angle is selected for a judder level of the display device, wherein the display device is a reference display scenario;
        adjust the selected judder angle based on brightness of a target display scenario, wherein the adjusted judder angle corresponds to a judder level of the target display scenario for the brightness of the target display scenario and wherein the adjusted judder angle is determined based on a ratio between the judder level of the reference display scenario and the judder level of the target display scenario, wherein judder level is an amount of perceived judder and judder angle is a linear measure;
        interpolate one or more frames for one or more of the plurality of input frames based on the adjusted judder angle, wherein the selected judder angle is selected via the input element of the user interface; and
        display the scene with a perceived judder of the reference display scenario resulting from interpolation of one or more frames.

2. The system of claim 1, wherein the selected judder angle corresponds to a position of the input element along the judder angle spectrum and the selected judder angle is selected via user input to the input element.

3. The system of claim 1, wherein the computing device is configured to execute further instructions stored in non-transitory memory that, when executed, cause the processor to adjust the selected judder angle based on one or more of panning speed and viewing distance of the target display scenario.

4. The system of claim 1, wherein the selected judder angle is adjusted to the adjusted judder angle for the brightness of the target display scenario based on a known relationship between brightness and judder level, wherein judder level is a log function of brightness.

5. The system of claim 1, wherein the computing device is configured to execute further instructions stored in non-transitory memory that, when executed, cause the processor to save the scene with the selected judder angle and resulting frame interpolations and perceived judder thereof.

6. The system of claim 1, wherein the judder angle spectrum is a linear spectrum and frame interpolation is non-linear, wherein judder angle has a relationship with a range of phase steps of the frame interpolation according to $JA = 360*(1-\text{range})$, where the range is the difference between a largest phase step and a smallest phase step.

7. A method, comprising:
    determining a selected judder angle corresponding to a first judder level for a scene of video media for a reference display scenario;

determining an adjusted judder angle for a target display scenario based on brightness of the target display scenario and the selected judder angle, wherein the adjusted judder angle corresponds to a second judder level for the target display scenario, wherein the first judder level and the second judder level are the same, wherein determining the adjusted judder angle is based at least in part on brightness being a log function of judder angle;

determining phase steps and interpolation phases for the scene based on the adjusted judder angle and a framerate conversion, wherein the adjusted judder angle has a relationship to a range of phase steps and the framerate conversion is a ratio between input framerate and output framerate;

interpolating frames between input frames of the scene based on the determined phase steps and interpolation phases; and saving the scene with the interpolated frames.

8. The method of claim 7, wherein the range of phase steps is a difference between a largest phase step and a smallest phase step.

9. The method of claim 8, wherein the largest phase step is positioned furthest from the input frames and one or more smallest phase steps are positioned closest to the input frames.

10. The method of claim 8, wherein the phase steps are equal phase steps except for one unequal phase step per input frame and a number of phase steps depends on the framerate conversion, wherein the one unequal phase step is the largest phase step and the equal phase steps are proportional to the adjusted judder angle and the framerate conversion.

11. The method of claim 7, wherein the phase steps are based on a change in phase over a predetermined time period.

12. The method of claim 11, wherein the predetermined time period is a multiple of the output framerate.

13. The method of claim 7, wherein the selected judder angle corresponds to a particular judder level irrespective of the framerate conversion.

14. The method of claim 13, further comprising determining the adjusted judder angle based on one or more of viewing distance and panning speed of the target display scenario.

15. A method, comprising:
determining a selected judder angle for a scene of video media based on user input, wherein the selected judder angle corresponds to a reference display scenario and the selected judder angle corresponds to a first judder level for the scene when displayed in the reference display scenario;

obtaining one or more parameters of a target display scenario, wherein the one or more parameters comprise one or more of brightness, panning speed, and viewing distance;

automatically adjusting the selected judder angle to an adjusted judder angle based on the one or more parameters of the target display scenario, wherein the adjusted judder angle is determined based on determining a ratio between a second judder level of the target display scenario as affected by the one or more parameters and the first judder level;

interpolating frames between input frames of the scene based on the adjusted judder angle and an output framerate, wherein frame interpolation is non-linear and phase steps of frame interpolation are determined based on the adjusted judder angle; and saving the scene to memory.

16. The method of claim 15, wherein the selected judder angle is determined based on user input to a user interface through which the scene is displayed, wherein the user input comprises movement of an adjustable dial.

17. The method of claim 15, wherein judder level is a log function of brightness.

18. The method of claim 15, further comprising obtaining one or more second parameters of a second target display scenario and adjusting the selected judder angle to a second adjusted judder angle based on the one or more second parameters.

19. The method of claim 15, wherein brightness is determined as luminance displayed by a display device of the target display scenario, and wherein luminance is one of peak luminance and average picture level (APL) at a region of the scene.

20. The method of claim 15, wherein the selected judder angle and the adjusted judder angle are linear measures between 0 and 360 degrees.

* * * * *